(12) United States Patent
Tan et al.

(10) Patent No.: US 8,447,430 B1
(45) Date of Patent: May 21, 2013

(54) SYSTEMS AND METHODS FOR ASSEMBLY TOOL CALIBRATION VERIFICATION (75) Inventors: Jit Han Tan, Petaling Jaya (MY); Eng Hin Tan, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 408 days.

(21) Appl. No.: 12/828,140

(22) Filed: Jun. 30, 2010

(51) Int. Cl.
*G05B 19/18* (2006.01)

(52) U.S. Cl.
USPC .......................................................... 700/254

(58) Field of Classification Search
USPC .......................................................... 701/254
See application file for complete search history.

(56) References Cited

U.S. PATENT DOCUMENTS

| | | |
|---|---|---|
| 2,435,907 A | 2/1948 | Henry |
| 3,334,340 A | 8/1967 | McConnell |
| 3,434,218 A | 3/1969 | Potter |
| 3,478,436 A | 11/1969 | Barnes |
| 3,531,868 A | 10/1970 | Stevenson |
| 3,605,531 A | 9/1971 | Izumi et al. |
| 4,166,543 A | 9/1979 | Dahlstrom |
| 4,362,977 A | 12/1982 | Evans et al. |
| 4,382,215 A | 5/1983 | Barlow et al. |
| 4,862,584 A | 9/1989 | Budy et al. |
| 5,297,238 A * | 3/1994 | Wang et al. .................. 700/259 |
| 5,566,447 A | 10/1996 | Sakurai |
| 6,429,999 B1 | 8/2002 | Dague et al. |
| 6,577,474 B2 | 6/2003 | Kazmierczak et al. |
| 6,889,424 B2 | 5/2005 | Slife et al. |
| 2001/0055069 A1 * | 12/2001 | Hudson ........................ 348/302 |
| 2004/0236465 A1 * | 11/2004 | Butka et al. .................. 700/245 |
| 2009/0062960 A1 * | 3/2009 | Krishnasamy et al. ....... 700/258 |

FOREIGN PATENT DOCUMENTS

EP 0353585 A2 2/1990

* cited by examiner

*Primary Examiner* — James Trammell
*Assistant Examiner* — Michael D Lang (57) ABSTRACT

An assembly tool calibration verification system includes a hard drive component gauge (HDCG), a vision system, a controller, and a gripper assembly. The HDCG includes a first vision detection feature. The vision system is configured to capture an image of the HDCG. The controller is configured to determine a position of the HDCG based on the first vision detection feature in the captured image of the HDCG. The gripper assembly is configured to pick the HDCG from a tray and is positioned for picking the HDCG from the tray based on the determined position of the HDCG. The controller is further configured to generate a calibration verification signal based on at least one of determining the position of the HDCG by the controller and picking the HDCG from the tray by the gripper assembly.

22 Claims, 9 Drawing Sheets

SYSTEMS AND METHODS FOR ASSEMBLY TOOL CALIBRATION VERIFICATION

FIELD

The present invention generally relates to manufacturing and assembly equipment and, in particular, relates to systems and methods for assembly tool calibration verification.

BACKGROUND

Because of increasing complexity in hard drive components, precision and reliability in hard drive assembly tools are needed. Unfortunately, hard drive assembly tools may break down or become uncalibrated after repeated use, thereby rendering the hard drive assembly tools unfit for their purpose. While operators can manually inspect these assembly tools for wear and tear and other errors, these errors can be overlooked. It is therefore desirable to provide an automated process for verifying the calibration of a hard drive assembly tool.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

During hard drive assembly processes, a hard drive assembly tool may include a gripper assembly used to pick hard drive components from trays and place the hard drive components onto other hard drive components. The assembly tool may also include a controller to activate and position the gripper assembly. In some aspects, the assembly tool may also include a vision system used to guide the gripper assembly to various positions for picking and/or placing. The picking and placing operation may be repeated numerous times in an assembly line process for manufacturing hard drives. According to various aspects of the subject technology, an assembly tool calibration verification system (ATCVS) is provided for verifying the calibration of the assembly tool, particularly with respect to the picking and/or placing operation of the assembly tool.

Figure 1:
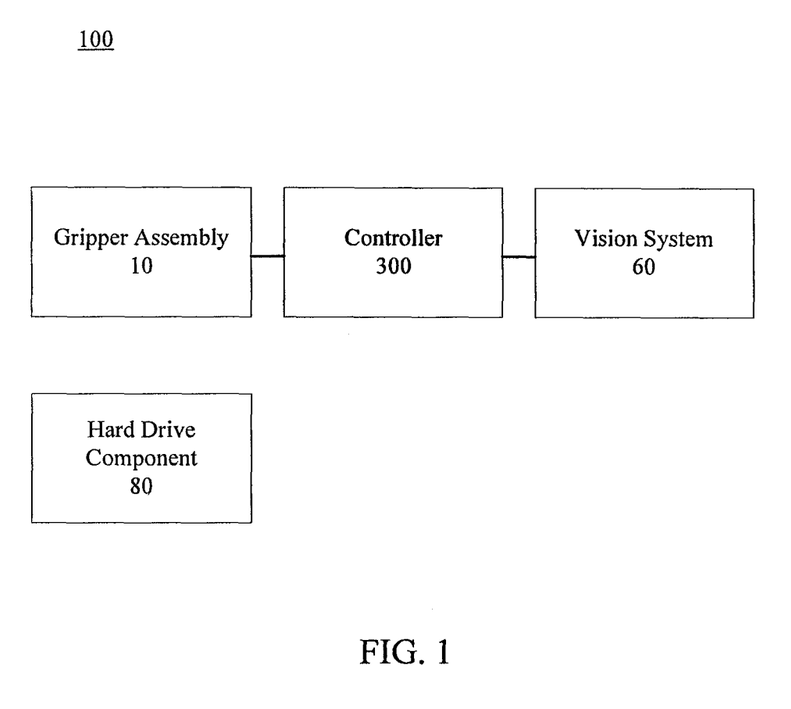
FIG. 1 is a block diagram illustrating components of an assembly tool calibration verification system in accordance with various aspects of the subject technology.

FIG. 1 is a block diagram illustrating components of assembly tool calibration verification system (ATCVS) 100 in accordance with various aspects of the subject technology. In some aspects, ATCVS 100 comprises gripper assembly 10 configured to grip hard drive component 80 for picking and/or placing hard drive component 80. ATCVS 100 also comprises controller 300, which may be used to control the operation of gripper assembly 10. In some aspects, ATCVS 100 comprises vision system 60, which may be used to assist gripper assembly 10 in locating a position of hard drive component 80 for the picking and/or placing operation. ATCVS 100 is an example of the ATCVS used for verifying the calibration of the assembly tool. Gripper assembly 10 is an example of the gripper assembly of the assembly tool. Controller 300 is an example of the controller of the assembly tool. Vision system 60 is an example of the vision system of the assembly tool.

Figure 2:
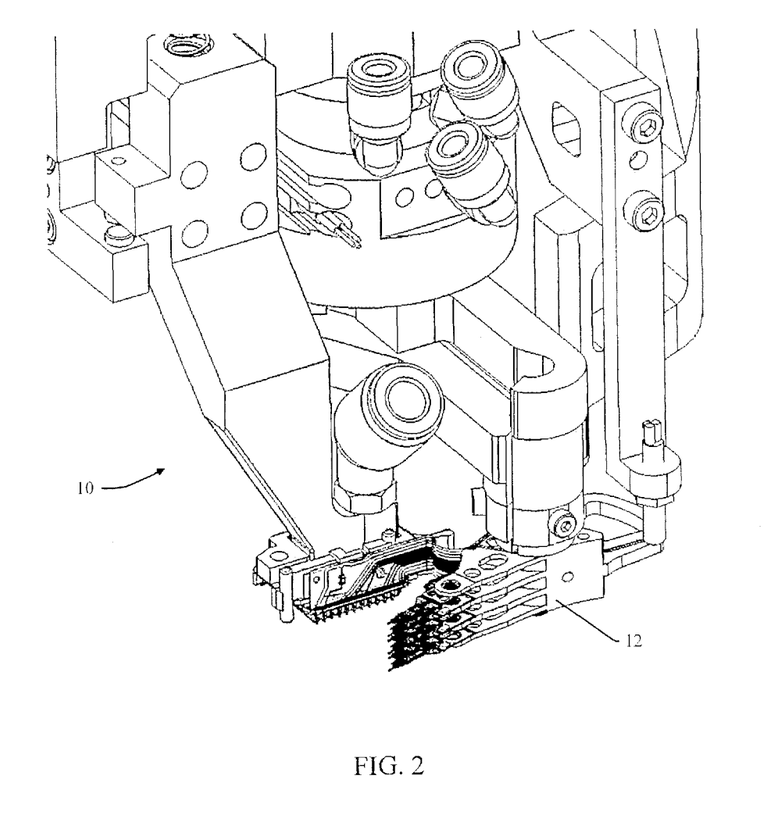
FIG. 2 illustrates a perspective view of a gripper assembly in accordance with various aspects of the subject technology.

FIG. 2 illustrates a perspective view of gripper assembly 10 in accordance with various aspects of the subject technology. As shown in FIG. 2, gripper assembly 10 is gripping head stack assembly 12, which is an example of hard drive component 80. In some aspects, gripper assembly 10 uses vacuum suction to grip head stack assembly 12. The assembly tool may use gripper assembly 10 to pick head stack assembly 12 from a head stack tray and place head stack assembly 12 onto a head disk assembly.

Although FIG. 2 illustrates gripper assembly 10 as using vacuum suction to grip head stack assembly 12, other suitable gripping mechanisms may be used including, for example and without limitation, gripping fingers. Furthermore, the subject technology is not limited to picking and/or placing head stack assemblies, but may also include picking and/or placing other hard drive components. For example, hard drive component 80 may include, for example and without limitation, a top cover of a hard drive or a top voice coil magnet (TVCM).

In some aspects, the picking and/or placing operation of the assembly tool may be performed using hard drive component gauges to verify the calibration of the assembly tool. Hard drive component gauges simulate corresponding hard drive components. However, the hard drive component gauges are typically manufactured under stricter tolerance requirements than the corresponding hard drive components. For example, hard drive component gauges may comprise dimensions having a tolerance control that is 50% less than a tolerance control of dimensions of the corresponding hard drive components. Thus, hard drive component gauges are more likely to be closer to ideal dimensions than average corresponding hard drive components produced under a more lenient tolerance control. In some aspects, hard drive component gauges having stricter or more lenient tolerance controls may be used depending on the amount of accuracy desired.

Thus, if calibration of the assembly tool is determined to be needed for the picking and/or placing operation using the hard drive component gauges, then calibration of the assembly tool may also be needed in the picking and/or placing operation using the corresponding hard drive components.

Therefore, if the assembly tool is calibrated according to the picking and/or placing operation performed using the hard drive component gauges, then the assembly tool may also be calibrated with respect to the picking and/or placing operation using the corresponding hard drive components. The subject technology, however, is not limited to using the hard drive component gauges to verify the calibration of the assembly tool. In some aspects, actual hard drive components may also be used.

Figure 3:
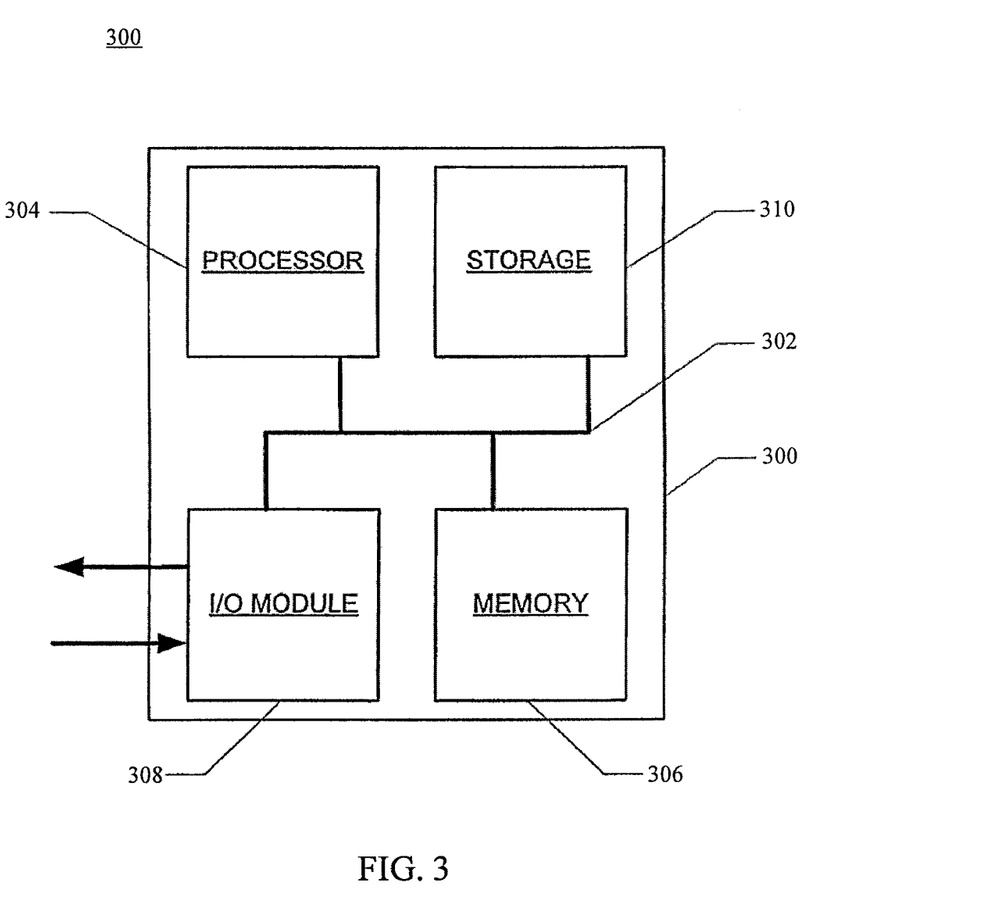
FIG. 3 is a block diagram illustrating components of a controller in accordance with various aspects of the subject technology.

FIG. 3 is a block diagram illustrating components of controller 300 in accordance with various aspects of the subject technology. Controller 300 may be used to verify the calibration of the assembly tool. In some aspects, the operation of ATCVS 100 is controlled by one or more programs stored in or entered into controller 300, for example. Thus, an operator of ATCVS 100 may control its operation by selecting, modifying, and/or creating programs stored in controller 300.

According to various aspects of the subject technology, controller 300 comprises processor module 304, storage module 310, input/output (I/O) module 308, memory module 306, and bus 302. Bus 302 may be any suitable communication mechanism for communicating information. Processor module 304, storage module 310, I/O module 308, and memory module 306 are coupled with bus 302 for communicating information between any of the modules of controller 300 and/or information between any module of controller 300 and a device external to controller 300. For example, information communicated between any of the modules of controller 300 may include instructions and/or data. In some aspects, bus 302 may be a universal serial bus. In some aspects, bus 302 may provide Ethernet connectivity.

In some aspects, processor module 304 may comprise one or more processors, where each processor may perform different functions or execute different instructions and/or processes. For example, one or more processors may execute instructions for operating ATCVS 100, one or more processors may execute instructions for verifying the calibration of the assembly tool, and one or more processors may execute instructions for input/output functions.

Memory module 306 may be random access memory ("RAM") or other dynamic storage devices for storing information and instructions to be executed by processor module 304. Memory module 306 may also be used for storing temporary variables or other intermediate information during execution of instructions by processor 304. In some aspects, memory module 306 may comprise battery-powered static RAM, which stores information without requiring power to maintain the stored information. Storage module 310 may be a magnetic disk or optical disk and may also store information and instructions. In some aspects, storage module 310 may comprise hard disk storage or electronic memory storage (e.g., flash memory). In some aspects, memory module 306 and storage module 310 are both a machine-readable medium.

In some aspects, controller 300 is coupled via I/O module 308 to a suitable user interface for providing information to and receiving information from an operator of ATCVS 100. For example, the user interface may be a cathode ray tube ("CRT") or liquid crystal display ("LCD") monitor for displaying information to an operator. The user interface may also include, for example, a keyboard or a mouse coupled to controller 300 via I/O module 308 for communicating information and command selections to processor module 304. In some aspects, the operator of ATCVS 100 may be informed via I/O module 308 whether calibration of the assembly tool is needed. For example, this information may be displayed on the LCD monitor.

According to various aspects of the subject technology, methods described herein are executed by controller 300. Specifically, processor module 304 executes one or more sequences of instructions contained in memory module 306 and/or storage module 310. In one example, instructions may be read into memory module 306 from another machine-readable medium, such as storage module 310. In another example, instructions may be read directly into memory module 306 from I/O module 308, for example from an operator of ATCVS 100 via the user interface. Execution of the sequences of instructions contained in memory module 306 and/or storage module 310 causes processor module 304 to perform methods to verify the calibration of the assembly tool. For example, a computational algorithm for verifying the calibration of the assembly tool may be stored in memory module 306 and/or storage module 310 as one or more sequences of instructions. Information may be communicated from processor module 304 to memory module 306 and/or storage module 310 via bus 302 for storage. In some aspects, the information may be communicated from processor module 304, memory module 306, and/or storage module 310 to I/O module 308 via bus 302. The information may then be communicated from I/O module 308 to an operator of ATCVS 100 via the user interface.

One or more processors in a multi-processing arrangement may also be employed to execute the sequences of instructions contained in memory module 306 and/or storage module 310. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 304 for execution. Such a medium may take many forms, including, but not limited to, non-volatile media, and volatile media. Non-volatile media include, for example, optical or magnetic disks, such as storage module 310. Volatile media include dynamic memory, such as memory module 306. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Although controller 300 is illustrated as comprising processor module 304, storage module 310, memory module 306, I/O module 308, and bus 302, other suitable arrangements (e.g., having more or less modules) known to those of ordinary skill in the art may be used. For example, controller 300 may be a logic implemented state machine or a programmable logic controller.

Figure 4:
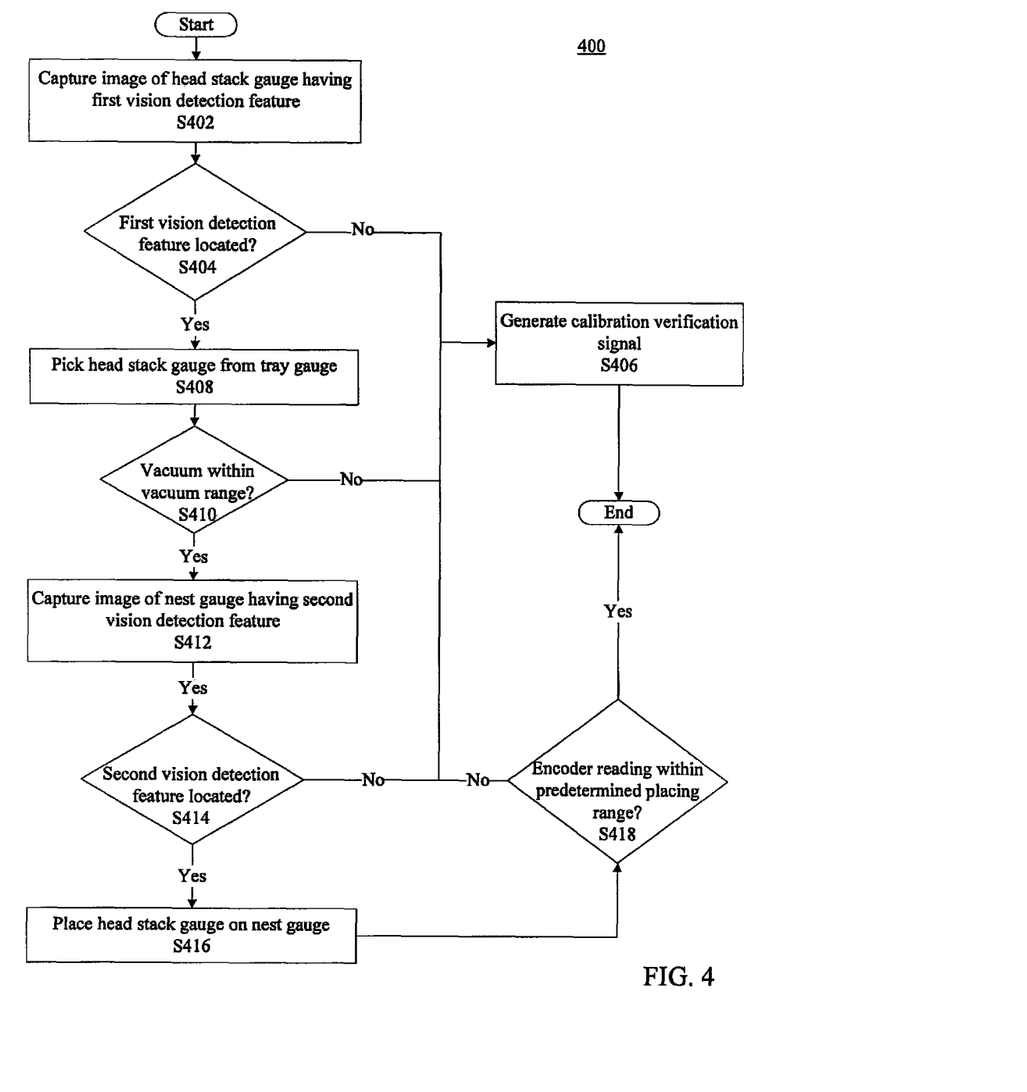
FIG. 4 illustrates an example of a method for verifying the calibration of an assembly tool in accordance with various aspects of the subject technology.

FIG. 4 illustrates an example of method 400 for verifying the calibration of the assembly tool in accordance with various aspects of the subject technology. In some aspects, gripper assembly 10 is used to pick a hard drive component gauge from a tray gauge and place the hard drive component gauge onto a nest gauge. Method 400 may be implemented by an operator of ATCVS 100 for verifying the calibration of the assembly tool, particularly with respect to the picking and/or placing operation of the assembly tool. One or more sequences of instructions used to perform method 400 may be stored in memory module 306 and/or storage module 310.

Processor module 304 may execute these sequences of instructions to verify the calibration of the assembly tool.

In some aspects, the operator of ATCVS 100 may execute method 400 as a daily routine to verify the calibration of the assembly tool. In an initialization process at the "Start" of method 400 before step S402 is executed, the operator of ATCVS 100 may replace a hard drive component on a hard drive production line with the hard drive component gauge. The operator may also replace any hard drive component nests and trays with the nest gauge and/or tray gauge for receiving the hard drive component gauge. For example, the hard drive component gauge may be initially placed on the tray gauge, which may be placed on a tray nest assembly. The nest gauge may be initially placed on a disk drive assembly nest. While hard drive component gauges may be used in the implementation of method 400, actual hard drive components may also be used.

Figure 5A:
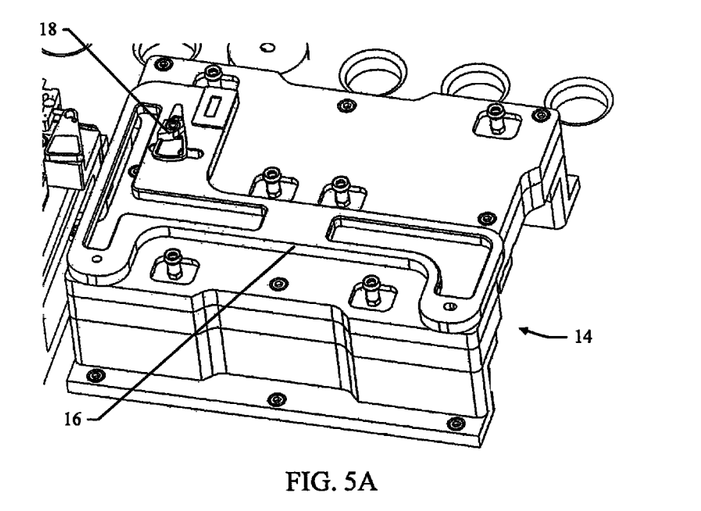
FIGS. 5A, 5B, 5C, and 5D illustrate an example of a head stack gauge placed on a tray gauge in accordance with various aspects of the subject technology.
Figure 5B:
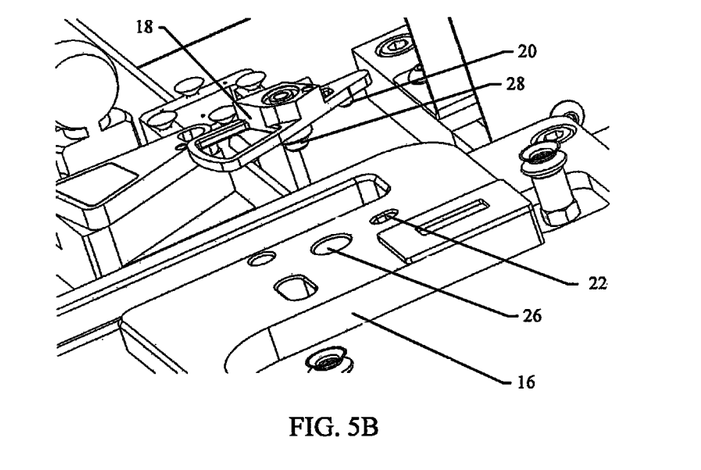

FIGS. 5A, 5B, 5C, and 5D illustrate head stack gauge 18 as an example of the hard drive component gauge, and tray gauge 16 as an example of the tray gauge on which head stack gauge 18 is placed, in accordance with various aspects of the subject technology. As shown in FIG. 5B, tray gauge 16 defines one or more holes 22, and head stack gauge 18 comprises one or more dowels 20 configured to be inserted into the one or more holes 22 for aligning head stack gauge 18 with tray gauge 16. In some aspects, tray gauge 16 defines pivot pocket 26, and head stack gauge 18 comprises pivot 28 configured to engage pivot pocket 26 for aligning head stack gauge 18 with tray gauge 16.

Figure 5C:
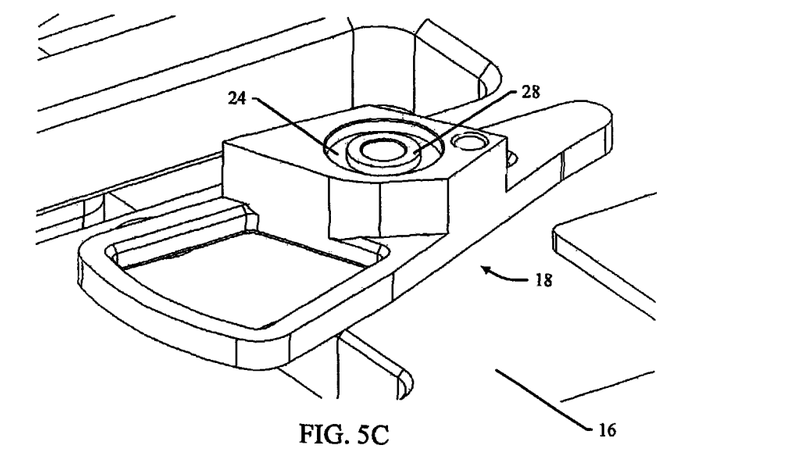
Figure 5D:
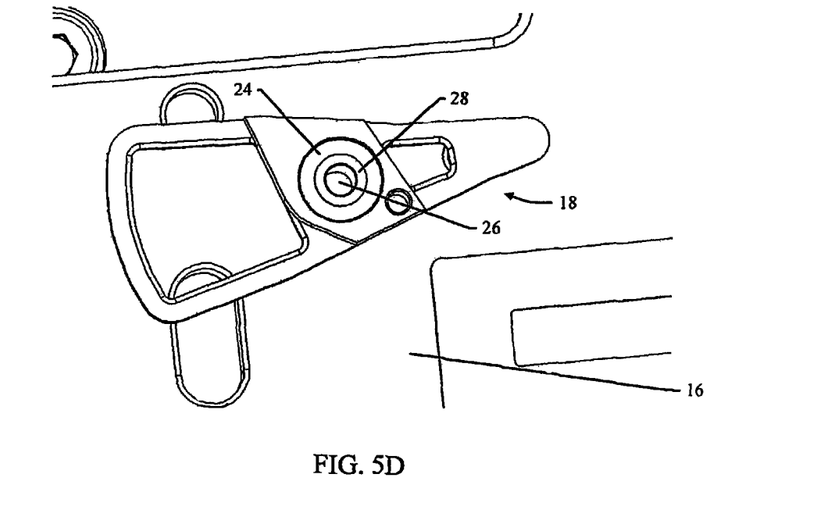

As shown in FIGS. 5C and 5D, head stack gauge 18 comprises gripping surface 24, which gripper assembly 10 engages to grip head stack gauge 18 for the picking and/or placing operation. In some aspects, head stack gauge 18 is configured to simulate a head stack assembly. Because head stack gauge 18 is used instead of the head stack assembly in the picking and/or placing operation of the assembly tool, tray gauge 16 is used for receiving head stack gauge 18 instead of tray nest assembly 14, which may typically be used to receive actual head stack assemblies. In this regard, tray gauge 16 is placed over tray nest assembly 14, as shown in FIG. 5A.

Figure 6:
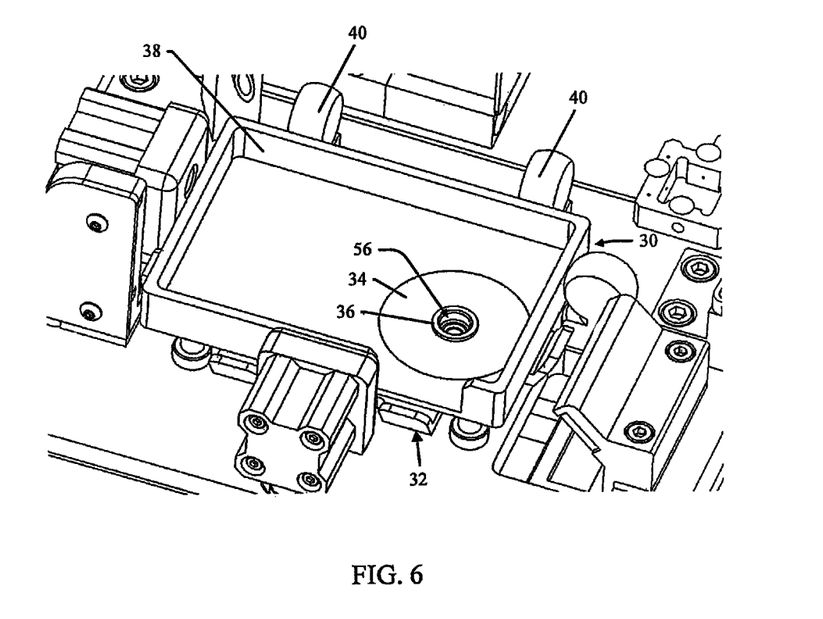
FIG. 6 illustrates an example of a nest gauge placed on a disk drive assembly nest in accordance with various aspects of the subject technology.

As noted above, the nest gauge may be initially placed on a disk drive assembly nest. FIG. 6 illustrates nest gauge 30 as an example of the nest gauge, and disk drive assembly nest 32 as an example of the disk drive assembly nest in accordance with various aspects of the subject technology. Nest gauge 30 comprises one or more stainless steel walls 38 configured to engage one or more datum features 40 of disk drive assembly nest 32 for positioning nest gauge 30 on disk drive assembly nest 32. Nest gauge 30 is configured to simulate a disk drive assembly and to receive head stack gauge 18. In some aspects, nest gauge 30 comprises placement area 56. Pivot 28 of head stack gauge 18 is configured to engage placement area 56 such that nest gauge 30 may receive head stack gauge 18.

According to certain aspects, tray gauge 16 and nest gauge 30 are made of stainless steel, which beneficially provides sufficient strength for these gauges to withstand repeated contact with head stack gauge 18. In some aspects, head stack gauge 18 is made of aluminum because aluminum is light in weight, resulting in less force being needed to pick and/or place head stack gauge 18. However, tray gauge 16, nest gauge 30, and head stack gauge 18 may be made of other suitable material known to those of ordinary skill in the art.

Referring back to FIG. 4, during the initialization process, gripper assembly 10 may be positioned within the vicinity of head stack gauge 18 that is on tray gauge 16. For example, gripper assembly 10 may be positioned over at least a part of tray gauge 16. According to various aspects of the subject technology, vision system 60 is configured to capture an image of head stack gauge 18, according to step S402. Vision system 60 may comprise a camera, for example, that is used to assist gripper assembly 10 in locating the position of head stack gauge 18. In some aspects, vision system 60 may be mounted on gripper assembly 10 or a separate structure as long as the viewable area of vision system 60 includes head stack gauge 18 on tray gauge 16. Thus, in some aspects, when gripper assembly 10 is initially positioned within the vicinity of head stack gauge 18 on tray gauge 16, gripper assembly 10 may be positioned within the viewable area of vision system 60 that includes head stack gauge 18.

In some aspects, vision system 60 comprises a processing system to perform image processing techniques to locate vision detection features of head stack gauge 18 in the captured image and locate the position of head stack gauge 18 based on the vision detection features. In some aspects, controller 300 may be used to perform the foregoing image processing techniques. Vision systems are well known in the art and a detailed description of the vision system components and image processing techniques are not discussed in detail herein.

In some aspects, controller 300 receives the captured image of head stack gauge 18 to determine its position. In some aspects, controller 300 may locate a first vision detection feature of head stack gauge 18 in the captured image. According to certain aspects, the first vision detection feature may comprise a first surface adjacent to a second surface to form a silhouette profile. The first surface of the first vision detection feature and the second surface of the first vision detection feature may be of different color, contrast, and/or texture. For example, the first surface of the first vision detection feature may be one of a stainless steel surface and a black Semitron surface, while the second surface of the first vision detection feature may be the other of the stainless steel surface and the black Semitron surface. However, the first surface and the second surface of the second vision detection feature may be other suitable surfaces of different color, contrast, and/or texture. Thus, controller 300 may locate the first vision detection feature of head stack gauge 18 in the captured image by locating the silhouette profile formed by the first surface and the second surface of the first vision detection feature.

As shown in FIG. 5D, gripping surface 24 is an example of the first surface of the first vision detection feature, and a top surface of pivot 28 is an example of the second surface of the first vision detection feature. Gripping surface 24 and the top surface of pivot 28 may form concentric circular surfaces of different color, contrast, and/or texture to form the silhouette profile, which controller 300 may locate in the captured image of head stack gauge 18. In some aspects, the silhouette profile located by controller 300 does not need to be formed with surfaces of the same component. In some aspects, the silhouette profile may be formed by surfaces of different components. For example, the first surface of the first vision detection feature may be a surface of pivot pocket 26 of tray gauge 16 (which is visible through the hole defined in pivot 28) and the second surface of the first vision detection feature may be at least one of gripping surface 24 of head stack gauge 18 and the top surface of pivot 28 of head stack gauge 18.

In some aspects, head stack gauge 18 may comprise another surface replacing the hole defined in pivot 28, which may be either the first surface of the first vision detection feature or the second surface of the first vision detection feature. For example, pivot 28 may not have the hole defined therethrough, but is rather formed continuously, thereby providing a larger top surface of pivot 28.

Figure 7:
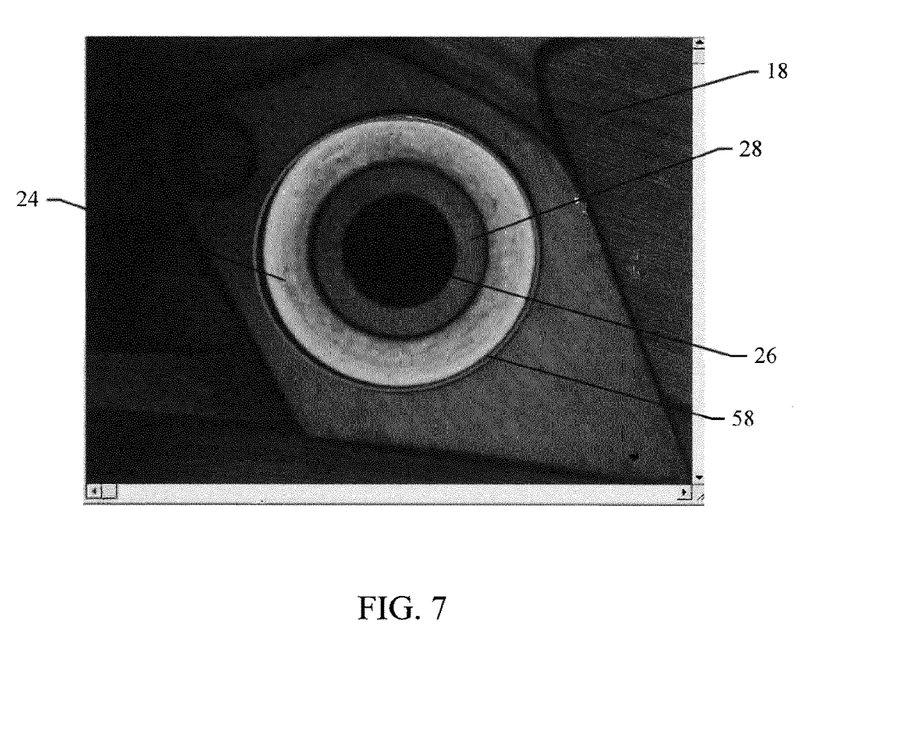
FIG. 7 illustrates an example of a captured image of a head stack gauge in accordance with various aspects of the subject technology.

FIG. 7 illustrates an example of a captured image of head stack gauge 18 in accordance with various aspects of the subject technology. In some aspects, the silhouette profile may be formed by any two surfaces of gripping surface 24, the top surface of pivot 28, and a surface of pivot pocket 26. As shown in this example, controller 300 may locate the first vision detection feature of head stack gauge 18 by locating the silhouette profile within ring 58 in the captured image of head stack gauge 18. In particular, controller 300 may locate the silhouette profile if it locates two concentric circular surfaces of different contrast fitting within ring 58 in the captured image. In some aspects, the first vision detection feature of head stack gauge 18 is not limited to the silhouette profile, but may include other suitable vision detection features involving specific shapes, colors, outlines, etc. that may be located by controller 300 and/or vision system 60.

Referring back to FIG. 4, if the first vision detection feature of head stack gauge 18 is not located by controller 300, then controller 300 generates a calibration verification signal, according to steps S404 and S406. In some aspects, the first vision detection feature of head stack gauge 18 is not located if controller 300 is unable to locate the silhouette profile within a first predetermined detection time. The first predetermined detection time may be set at an appropriate time by an operator of ATCVS 100 and stored in memory module 306 and/or storage module 310. The failure of controller 300 to locate the first vision detection within the first predetermined detection time may indicate that head stack gauge 18 is not positioned on tray gauge 16, that the viewable area of vision system 60 does not include head stack gauge 18, that head stack gauge 18 is obstructed from vision system 60, or other possible errors. Thus, the calibration verification signal generated may inform an operator of ATCVS 100 that calibration is needed to address the possible errors in preventing controller 300 from locating the first vision detection feature of head stack gauge 18. Once the assembly tool is calibrated, method 400 may be implemented again.

If the first vision detection feature of head stack gauge 18 is located by controller 300, then gripper assembly 10 may be used to pick head stack gauge 18 from tray gauge 16, according to step S408. In some aspects, controller 300 is configured to determine a position of head stack gauge 18 based on the first vision detection feature. For example, controller 300 may use image processing techniques known to those of ordinary skill in the art to determine the position of head stack gauge 18 based on the first vision detection feature. Once the position of head stack gauge 18 is determined, gripper assembly 10 may be positioned accordingly over head stack gauge 18 to pick head stack gauge 18 from tray gauge 16.

In some aspects, gripper assembly 10 uses vacuum suction to grip head stack gauge 18. For example, gripper assembly 10 engages gripping surface 24 such that a vacuum seal is formed between gripper assembly 10 and gripping surface 24. In some aspects, gripper assembly 10 comprises a vacuum source configured to apply a vacuum to create vacuum suction sufficient in strength to grip and pick head stack gauge 18. In some aspects, gripper assembly 10 also comprises one or more vacuum sensors configured to detect a magnitude of the vacuum applied by the vacuum source to grip head stack gauge 18.

According to various aspects of the subject technology, a vacuum within a predetermined vacuum range may indicate that gripper assembly 10 is gripping head stack gauge 18. On the other hand, a vacuum beyond the predetermined vacuum range may indicate that gripper assembly 10 is not gripping head stack gauge 18. For example, if the vacuum is beyond the predetermined vacuum range, gripper assembly 10 may not be properly engaged to gripping surface 24 to form the vacuum seal needed to grip head stack gauge 18, thereby causing the vacuum to be beyond the predetermined vacuum range. The predetermined vacuum range may be set at an appropriate range by the operator of ATCVS 100 and stored in storage module 310 and/or memory module 306. In some aspects, if the vacuum detected by the one or more sensors is of a magnitude that is not within the predetermined vacuum range, then the calibration verification signal is generated, according to steps S410 and S406.

The vacuum being of a magnitude that is not within the predetermined vacuum range may indicate that gripper assembly 10 is not positioned correctly with respect to head stack gauge 18 to form the vacuum seal with gripping surface 24, that the vacuum source is not generating a strong enough vacuum, that head stack gauge 18 is stuck to tray gauge 16, or other possible errors. Thus, the calibration verification signal generated may inform the operator of ATCVS 100 that calibration is needed to address the possible errors preventing gripper assembly 10 from gripping head stack gauge 18. Once the assembly tool is calibrated, method 400 may be implemented again.

If the vacuum detected by the one or more sensors is within the predetermined vacuum range, then gripper assembly 20 and the gripped head stack gauge 18 are positioned within the vicinity of nest gauge 30 on disk drive assembly nest 32. For example, gripper assembly 10 and the gripped head stack gauge 18 may be positioned over at least a part of disk drive assembly nest 32. Once gripper assembly 10 and the gripped head stack gauge 18 are positioned within the vicinity of nest gauge 30, vision system 60 captures an image of nest gauge 30, according to step S412. In some aspects, the viewable area of vision system 60 includes nest gauge 30 so that vision system 60 can capture the image of nest gauge 30. In some aspects, when gripper assembly 10 is positioned within the vicinity of nest gauge 30, gripper assembly 10 may be positioned within the viewable area of vision system 60 that includes nest gauge 30.

In some aspects, controller 300 receives the captured image of nest gauge 30 to determine its position. Controller 300 may locate vision detection features of nest gauge 30 in the captured image of nest gauge 30 in a manner similar to controller 300 locating the vision detection features of head stack gauge 18 in the captured image of head stack gauge 18. For example, controller 300 may locate a second vision detection feature of nest gauge 30 in the captured image of nest gauge 30. According to certain aspects, the second vision detection feature may comprise a first surface adjacent to a second surface to form a silhouette profile. The first surface of the second vision detection feature and the second surface of the second vision detection feature may be of different color, contrast, and/or texture. For example, the first surface of the second vision detection feature may be one of a stainless steel surface and a black Semitron surface, while the second surface of the second vision detection feature may be the other of the stainless steel surface and the black Semitron surface. However, the first surface and the second surface of the second vision detection feature may be other suitable surfaces of different color, contrast, and/or texture. Thus, controller 300 may locate the second vision detection feature of nest gauge 30 in the captured image by locating the silhouette profile formed by the first surface and the second surface of the second vision detection feature.

As shown in FIG. 6, surface 34 of nest gauge 30 is an example of the first surface of the second vision detection feature, and a top surface of ring 36 of nest gauge 30 is an example of the second surface of the second vision detection feature. Surface 34 and the top surface of ring 36 may form concentric circular surfaces of different color, contrast, and/or texture to form the silhouette profile of the second vision detection feature, which controller 300 may locate in the captured image of nest gauge 30. In some aspects, the silhouette profile of the second vision detection feature located by controller 300 does not need to be formed with surfaces of the same component. In some aspects, the silhouette profile may be formed by surfaces of different components. The second vision detection feature of nest gauge 30 is not limited to the silhouette profile, but may include other suitable vision detection features involving specific shapes, colors, outlines, etc. that may be located by controller 300 and/or vision system 60.

If the second vision detection feature of nest gauge 30 is not located by controller 300, then controller 300 generates the calibration verification signal, according to steps S414 and S406. In some aspects, the second vision detection feature of nest gauge 30 is not located if controller 300 is unable to locate the silhouette profile of the second vision detection feature within a second predetermined detection time. The second predetermined detection time may be set at an appropriate time by the operator of ATCVS 100 and stored in memory module 306 and/or storage module 310. The failure of controller 300 to locate the second vision detection feature within the second predetermined detection time may indicate that nest gauge 30 is not positioned on disk drive assembly nest 32, that the viewable area of vision system 60 does not include nest gauge 30, that nest gauge 30 is being obstructed from vision system 60, or other possible errors. Thus, the calibration verification signal generated may inform the operator of ATCVS 100 that calibration is needed to address the possible errors in preventing controller 300 from locating the second vision detection feature of nest gauge 30. Once the assembly tool is calibrated, method 400 may be implemented again.

If the second vision detection feature of nest gauge 30 is located by controller 300, then gripper assembly 10 may place the gripped head stack gauge 18 on nest gauge 30, according to step S416. In some aspects, controller 300 is configured to determine a position of nest gauge 30 based on the second vision detection feature. For example, controller 300 may use image processing techniques known to those of ordinary skill in the art to determine the position of nest gauge 30 based on the second vision detection feature. Once the position of nest gauge 30 is determined, gripper assembly 10 and the gripped head stack gauge 18 may be positioned accordingly over nest gauge 30 to place head stack gauge 18 on nest gauge 30.

Figure 8:
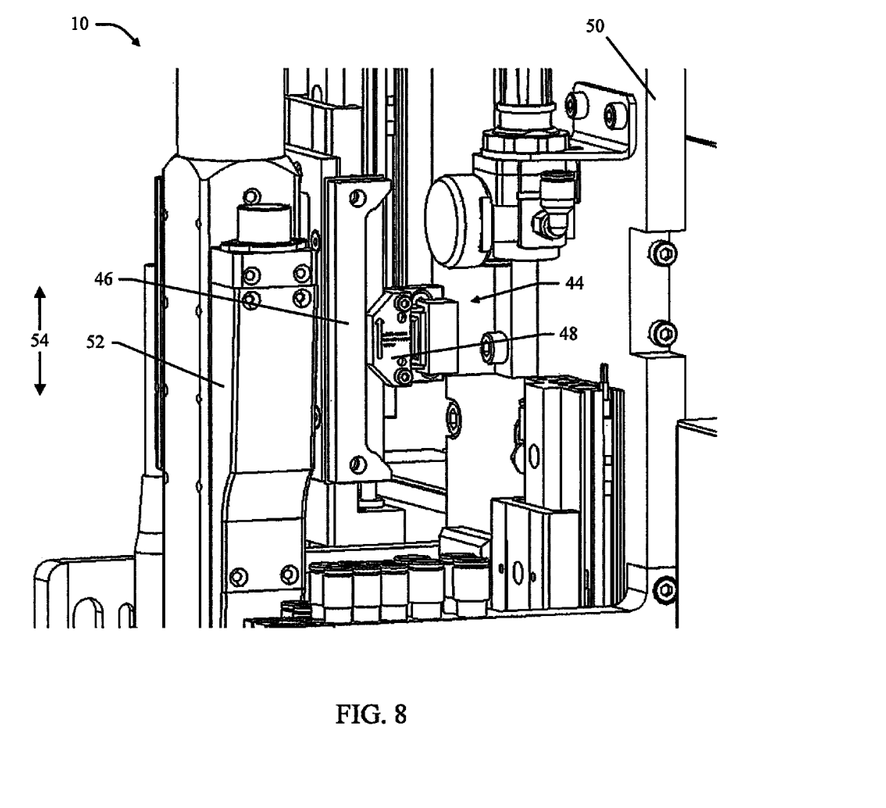
FIG. 8 illustrates an encoder of a gripper assembly in accordance with various aspects of the subject technology.

In some aspects, gripper assembly 10 comprises an encoder configured to measure a distance gripper assembly 10 travels to place head stack gauge 18 on nest gauge 30. FIG. 8 illustrates encoder 44 as an example of the encoder of gripper assembly 10 in accordance with various aspects of the subject technology. As shown in FIG. 8, gripper assembly 10 comprises body 50 and gripper arm 52 slidably mounted to body 50. A distal end of gripper arm 52 (not shown) grips head stack gauge 18. Gripper arm 52 slides along axis 54 relative to body 50 to pick and/or place head stack gauge 18. In some aspects, encoder 44 comprises scale 46 coupled to gripper arm 52. Encoder 44 also comprises reader 48 coupled to body 50. In some aspects, scale 46 may be coupled to gripper arm 52 while reader 32 may be coupled to body 50.

According to various aspects of the subject technology, encoder 44 measures the distance that gripper arm 52 slides along axis 54 by measuring a position of reader 48 relative to scale 46 when gripper arm 52 slides along axis 54 relative to body 50. Thus, when gripper arm 52 is lowered along axis 54 (as described relative to FIG. 8), encoder 44 may measure the distance gripper arm 52 travels to place head stack gauge 18 on nest gauge 30. This distance may be compared to a predetermined placing range. In some aspects, the predetermined placing range may be set at an appropriate range by the operator of ATCVS 100 and stored in storage module 310 and/or memory module 306. In some aspects, the predetermined placing range may be set such that if the distance that gripper arm 52 travels along axis 54 is within the predetermined placing range, then gripper arm 52 has traveled the appropriate distance needed to place head stack gauge 18 on nest gauge 30. Thus, if the reading of encoder 44 indicates that the distance that gripper arm 52 travels along axis 54 is within the predetermined placing range, the calibration verification signal is not generated, according to step S418. The lack of generation of such a signal may indicate to the operator of ATCVS 100 that calibration of the assembly tool is not needed, particularly with respect to the picking and/or placing operation of the assembly tool.

In some aspects, if the distance that gripper arm 52 travels along axis 54 is beyond the predetermined placing range, then gripper arm 52 is either incorrectly positioned with respect to head stack gauge 18 or gripper arm 52 has not traveled the appropriate distance along axis 54 needed to place head stack gauge 18 on nest gauge 30. For example, if gripper arm 52 travels a distance beyond the predetermined placing range, it may indicate that gripper arm 52 has not traveled enough to place head stack gauge 18 on nest gauge 30, that gripper arm 52 is not positioned directly over nest gauge 30 thereby causing gripper arm 52 to travel along axis 54 and potentially engage another object at a different distance outside of the predetermined placing range, or other possible errors. Thus, if the reading of encoder 44 indicates that the distance gripper arm 52 travels along axis 54 is not within the predetermined placing range, then the calibration verification signal is generated, according to steps S418 and S406. The calibration verification signal may inform the operator of ATCVS 100 that calibration is needed to address the possible errors preventing gripper arm 52 from traveling along axis 54 at a distance within the predetermined placing range. Once the assembly tool is calibrated, method 400 may be implemented again.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. An assembly tool calibration verification system comprising:
    a hard drive component gauge having a first vision detection feature;
    a vision system configured to capture an image of the hard drive component gauge;
    a controller configured to determine a position of the hard drive component gauge based on the first vision detection feature in the captured image of the hard drive component gauge; and
    a gripper assembly configured to pick the hard drive component gauge from a tray, wherein the gripper assembly is positioned for picking the hard drive component gauge from the tray based on the determined position of the hard drive component gauge,
    wherein the controller is further configured to generate a calibration verification signal based on at least one of determining the position of the hard drive component gauge by the controller and picking the hard drive component gauge from the tray by the gripper assembly.

2. The assembly tool calibration verification system of claim 1, further comprising:
    a nest gauge configured to receive the hard drive component gauge, the nest gauge having a second vision detection feature,
    wherein the vision system is further configured to capture an image of the nest gauge,
    wherein the controller is further configured to determine a position of the nest gauge based on the second vision detection feature in the captured image of the nest gauge,
    wherein the gripper assembly is further configured to place the hard drive component gauge on the nest gauge and wherein the gripper assembly is positioned for placing the hard drive component gauge on the nest gauge based on the determined position of the nest gauge, and
    wherein the controller is further configured to generate the calibration verification signal based on at least one of determining the position of the nest gauge by the controller and placing the hard drive component gauge on the nest gauge by the gripper assembly.

3. The assembly tool calibration verification system of claim 2, wherein the tray is a tray gauge.

4. The assembly tool calibration verification system of claim 3, wherein the tray gauge and the nest gauge are made of stainless steel, and wherein the hard drive component gauge is made of aluminum.

5. The assembly tool calibration verification system of claim 3, wherein the tray gauge defines a hole, and wherein the hard drive component gauge comprises a dowel configured to be inserted into the hole for aligning the hard drive component gauge with the tray gauge.

6. The assembly tool calibration verification system of claim 2, wherein the hard drive component gauge is configured to simulate a head stack assembly, and the nest gauge is configured to simulate a disk drive assembly.

7. The assembly tool calibration verification system of claim 6, wherein the hard drive component gauge comprises a gripping surface having a tolerance control that is 50% less than a tolerance control of a gripping surface of the head stack assembly, and wherein the nest gauge comprises a placement area having a tolerance control that is 50% less than a tolerance control of a placement area of the disk drive assembly.

8. The assembly tool calibration verification system of claim 2, wherein the nest gauge comprises one or more stainless steel walls configured to engage one or more datum features of a disk drive assembly nest for positioning the nest gauge on a disk drive assembly nest.

9. The assembly tool calibration verification system of claim 2,
    wherein the first vision detection feature comprises a first surface adjacent to a second surface to form a silhouette profile, wherein the first surface of the first vision detection feature and the second surface of the first vision detection feature are of different color, contrast, and/or texture,
    wherein the second vision detection feature comprises a first surface adjacent to a second surface to form a silhouette profile, and wherein the first surface of the second vision detection feature and the second surface of the second vision detection feature are of different color, contrast, and/or texture.

10. The assembly tool calibration verification system of claim 9, wherein the first surface of the first vision detection feature and the second surface of the first vision detection feature are concentric circular surfaces, and wherein one of the concentric circular surfaces is one of a stainless steel surface and a black Semitron surface and the other of the concentric circular surfaces is the other of the stainless steel surface and the black Semitron surface.

11. The assembly tool calibration verification system of claim 9, wherein the first surface of the second vision detection feature and the second surface of the second vision detection feature are concentric circular surfaces, and wherein one of the concentric circular surfaces is one of a stainless steel surface and a black Semitron surface and the other of the concentric circular surfaces is the other of the stainless steel surface and the black Semitron surface.

12. The assembly tool calibration verification system of claim 9, wherein the controller is configured to locate the silhouette profile of the first vision detection feature in the captured image of the hard drive component gauge, wherein the controller is configured to locate the silhouette profile of the second vision detection feature in the captured image of the nest gauge, and wherein the controller generates the calibration verification signal if the silhouette profile of the first vision detection feature and/or the silhouette profile of the second vision detection feature is not located within a predetermined detection time.

13. The assembly tool calibration verification system of claim 2, wherein the gripper assembly comprises an encoder configured to measure a distance the gripper assembly travels to place the hard drive component gauge on the nest gauge, and wherein the controller generates the calibration verification signal if the distance is not within a predetermined placing range.

14. The assembly tool calibration verification system of claim 1, wherein the gripper assembly comprises a vacuum source configured to apply a vacuum to the hard drive component gauge for picking the hard drive component gauge, wherein the gripper assembly further comprises a vacuum sensor configured to detect a magnitude of the vacuum applied by the vacuum source, and wherein the controller generates the calibration verification signal if the magnitude of the vacuum is not within a predetermined vacuum range.

15. A method for verifying the calibration of a picking and/or placing operation, the method comprising:
 capturing, with a vision system, an image of a hard drive component gauge having a first vision detection feature;
 determining a position of the hard drive component gauge based on the first vision detection feature in the captured image of the hard drive component gauge;
 positioning a gripper assembly for picking the hard drive component gauge from a tray based on the determined position of the hard drive component gauge;
 picking, with the gripper assembly, the hard drive component gauge from the tray; and
 generating a calibration verification signal based on at least one of determining the position of the hard drive component gauge and picking the hard drive component gauge from the tray.

16. The method of claim 15, further comprising:
 capturing, with the vision system, an image of a nest gauge having a second vision detection feature;
 determining a position of the nest gauge based on the second vision detection feature in the captured image of the nest gauge;
 positioning the gripper assembly for placing the hard drive component gauge on the nest gauge based on the determined position of the nest gauge; and
 placing, with the gripper assembly, the hard drive component gauge on the nest gauge,
 wherein the calibration verification signal is generated based on at least one of determining the position of the nest gauge and placing the hard drive component gauge on the nest gauge.

17. The method of claim 16,
 wherein the first vision detection feature comprises a first surface adjacent to a second surface to form a silhouette profile, wherein the first surface of the first vision detection feature and the second surface of the first vision detection feature are of different color, contrast, and/or texture,
 wherein the second vision detection feature comprises a first surface adjacent to a second surface to form a silhouette profile, and wherein the first surface of the second vision detection feature and the second surface of the second vision detection feature are of different color, contrast, and/or texture.

18. The method of claim 17, further comprising:
 locating the silhouette profile of the first vision detection feature in the captured image of the hard drive component gauge; and
 locating the silhouette profile of the second vision detection feature in the captured image of the nest gauge,
 wherein the calibration verification signal is generated if the silhouette profile of the first vision detection feature and/or the silhouette profile of the second vision detection feature is not located within a predetermined detection time.

19. The method of claim 16, wherein placing the hard drive component gauge comprises measuring, with an encoder of the gripper assembly, a distance the gripper assembly travels to place the hard drive component gauge on the nest gauge, and wherein the calibration verification signal is generated if the distance is not within a predetermined placing range.

20. The method of claim 15, wherein picking the hard drive component gauge comprises:
 applying, with a vacuum source of the gripper assembly, a vacuum to the hard drive component gauge; and
 detecting, with a vacuum sensor of the gripper assembly, a magnitude of the vacuum applied with the vacuum source,
 wherein the calibration verification signal is generated if the magnitude of the vacuum is not within a predetermined vacuum range.

21. A controller for an assembly tool calibration verification system, the controller comprising:
 a memory module containing executable instructions; and
 a processor configured to execute the instructions to perform a method for:
  capturing, with a vision system, an image of a hard drive component gauge having a first vision detection feature;
  determining a position of the hard drive component gauge based on the first vision detection feature in the captured image of the hard drive component gauge;
  positioning a gripper assembly for picking the hard drive component gauge from a tray based on the determined position of the hard drive component gauge;
  picking, with the gripper assembly, the hard drive component gauge from the tray; and
  generating a calibration verification signal based on at least one of determining the position of the hard drive component gauge and picking the hard drive component gauge from the tray.

22. A machine-readable medium encoded with executable instructions for verifying the calibration of a picking and/or placing operation, the instructions comprising code for:
- capturing, with a vision system, an image of a hard drive component gauge having a first vision detection feature;
- determining a position of the hard drive component gauge based on the first vision detection feature in the captured image of the hard drive component gauge;
- positioning a gripper assembly for picking the hard drive component gauge from a tray based on the determined position of the hard drive component gauge;
- picking, with the gripper assembly, the hard drive component gauge from the tray; and
- generating a calibration verification signal based on at least one of determining the position of the hard drive component gauge and picking the hard drive component gauge from the tray.

* * * * *